(12) United States Patent
Naftel et al.

(10) Patent No.: US 9,946,559 B1
(45) Date of Patent: Apr. 17, 2018

(54) TECHNIQUES FOR MANAGING VIRTUAL MACHINE BACKUPS

(75) Inventors: Timothy Michael Naftel, Longmont, CO (US); James Robert Olson, Afton, MN (US)

(73) Assignee: Veritas Technologies LLC, Mountain View, CA (US)

(*) Notice: Subject to any disclaimer, the term of this patent is extended or adjusted under 35 U.S.C. 154(b) by 861 days.

(21) Appl. No.: 13/372,026

(22) Filed: Feb. 13, 2012

(51) Int. Cl.
*G06F 9/455* (2006.01)
*G06F 9/46* (2006.01)
*G06F 11/14* (2006.01)

(52) U.S. Cl.
CPC .......... *G06F 9/455* (2013.01); *G06F 11/1448* (2013.01); *G06F 11/1453* (2013.01)

(58) Field of Classification Search
None
See application file for complete search history.

(56) References Cited

U.S. PATENT DOCUMENTS

| | | | |
|---|---|---|---|
| 8,117,168 B1* | 2/2012 | Stringham | 707/646 |
| 2005/0160150 A1* | 7/2005 | Kao | 709/212 |
| 2005/0216788 A1* | 9/2005 | Mani-Meitav et al. | 714/6 |
| 2005/0228950 A1* | 10/2005 | Karr | 711/114 |
| 2008/0155223 A1* | 6/2008 | Hiltgen et al. | 711/173 |
| 2009/0094603 A1* | 4/2009 | Hiltgen et al. | 718/1 |
| 2010/0235831 A1* | 9/2010 | Dittmer | 718/1 |
| 2011/0307657 A1* | 12/2011 | Timashev et al. | 711/112 |
| 2012/0110289 A1* | 5/2012 | Murase et al. | 711/162 |
| 2012/0215744 A1* | 8/2012 | Tsaur et al. | 707/667 |

OTHER PUBLICATIONS

"Boot Configuration Data Editor Frequently Asked Questions", Sep. 29, 2010.*
"Tips Linux Explorers", Jan. 26, 2005.*

* cited by examiner

*Primary Examiner* — Bradley Teets
(74) *Attorney, Agent, or Firm* — Patent Law Works LLP (57) ABSTRACT

Techniques for managing virtual machine backups are disclosed. In one particular exemplary embodiment, the techniques may be realized as a method for managing virtual machine backups comprising opening a file containing a virtual disk of a virtual machine, parsing the file to identify one or more partitions of the virtual disk, determining file system type for each of one or more partitions, identifying a boot partition in the file, parsing, using at least one computer processor, file system information of the boot partition to identify volume information; and generating volume composition information using the identified volume information.

20 Claims, 7 Drawing Sheets

TECHNIQUES FOR MANAGING VIRTUAL MACHINE BACKUPS

FIELD OF THE DISCLOSURE

The present disclosure relates generally to virtual machines and, more particularly, to techniques for managing virtual machine backups.

BACKGROUND OF THE DISCLOSURE

Virtual machine backups may contain a plurality of volumes associated with different file systems. The volumes may be used for different purposes and one or more volumes may not require backup. For example, a swap partition may not require a backup. Additionally, restoration processes or servers may require volume information in order to permit granular restoration. A backup process or server may view a virtual machine backup as a file and may not be able to identify different volumes in the virtual machine backup. The lack of visibility into a virtual machine backup may prevent exclusion of volumes from backup resulting in the backup of unnecessary volumes (e.g., swap space). The lack of visibility may also prevent a restoration process from providing granular restoration. A restoration server may be able to mount backed up disks in order to identify the composition of volumes (e.g., operating system type, mount points, drive letters, offset, GUID, etc.). However, in order to mount a backed up disk, the server attempting to mount the disk must have a file system compatible with the disk. For example, a Windows backup server may only be capable of mounting disks with Windows compatible file systems. Additionally, mounting the disks requires resources from a backup server. Capturing volume composition information at each virtual machine to allow granular backup and restoration would require an agent running on each virtual machine. This would add a load to each virtual machine.

In view of the foregoing, it may be understood that there may be significant problems and shortcomings associated with current virtual machine backup management module technologies.

SUMMARY OF THE DISCLOSURE

Techniques for managing virtual machine backups are disclosed. In one particular exemplary embodiment, the techniques may be realized as a method for managing virtual machine backups comprising opening a file containing a virtual disk of a virtual machine, parsing the file to identify one or more partitions of the virtual disk, determining file system type for each of one or more partitions, identifying a boot partition in the file, parsing, using at least one computer processor, file system information of the boot partition to identify volume information; and generating volume composition information using the identified volume information.

In accordance with other aspects of this particular exemplary embodiment, the techniques may further comprise: saving the generated volume composition information.

In accordance with further aspects of this particular exemplary embodiment, the volume composition may be provided to a user to identify one or more volumes for backup.

In accordance with additional aspects of this particular exemplary embodiment, the volume composition may allow a restore process to mount one or more volumes to allow granular restoration.

In accordance with additional aspects of this particular exemplary embodiment, parsing the file to identify one or more partitions of the virtual disk may comprise examining one or more of: a master boot record and an extended boot record.

In accordance with additional aspects of this particular exemplary embodiment, parsing the file to identify one or more partitions of the virtual disk may comprise examining a Globally Unique Identifier (GUID) Partition Table (GPT).

In accordance with additional aspects of this particular exemplary embodiment, parsing the file to identify one or more partitions of the virtual disk may comprise determining that a logical manager is used and reading configuration information for the logical manager.

In accordance with additional aspects of this particular exemplary embodiment, parsing the file to identify one or more partitions of the virtual disk may further comprise determining that a logical volume manager is used, and reading configuration information for the logical volume manager.

In accordance with additional aspects of this particular exemplary embodiment, the file system type for each of one or more partitions may comprise at least one of: FAT, NTFS, EXT, UFS, ZFS, and VxFS.

In accordance with additional aspects of this particular exemplary embodiment, at least one of the partitions may comprise a Windows compatible partition and parsing, using at least one computer processor, file system information of the boot partition to identify volume information may comprise: reading one or more of a boot.ini file or Boot Configuration Data (BCD) to identify a system directory, parsing the identified system directory to locate a registry, parsing the located registry to find one or more mount points, and assigning drive letters and Globally Unique Identifiers (GUIDs) to at least one of: a partition and a logical volume.

In accordance with additional aspects of this particular exemplary embodiment, at least one of the partitions may comprise a Linux compatible partition and parsing, using at least one computer processor, file system information of the boot partition to identify volume information may comprise parsing the file system to identify the file systems table (fstab) and the mounted file systems table (mtab), parse the identified mtab and fstab, and assign mount points to at least one of: a partition and a logical volume.

In accordance with additional aspects of this particular exemplary embodiment, the generation of volume composition information may be performed during backup.

In accordance with additional aspects of this particular exemplary embodiment, the generation of volume composition information may be performed prior to restoration.

In accordance with additional aspects of this particular exemplary embodiment, at least one of the partitions may comprise a Windows compatible partition and parsing, using at least one computer processor, file system information of the boot partition to identify volume information may comprise reading one or more of a boot.ini file or Boot Configuration Data (BCD) to identify a system directory, parsing the identified system directory to locate a registry, parsing the located registry to find paths to one or more swap files, mapping one or more swap files to sectors of a virtual disk, and excluding the mapped swap file sectors from a backup.

In accordance with additional aspects of this particular exemplary embodiment, one or more of the partitions may comprise a Linux compatible partition and parsing, using at least one computer processor, file system information of the boot partition to identify volume information may comprise parsing the partition table to identify one or more swap partitions, and excluding the one or more identified swap partitions from a backup.

In accordance with additional aspects of this particular exemplary embodiment, saving generated volume composition may comprise writing the generated volume composition to a backup catalog.

In accordance with additional aspects of this particular exemplary embodiment, granular restoration may comprise restoration of one or more of: an individual file, a collection of files, an Exchange mailbox, a database table, and a user specified data object.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing one or more of the methods.

In another particular exemplary embodiment, the techniques may be realized as an article of manufacture for managing virtual machine backups, the article of manufacture comprising: at least one non-transitory processor readable storage medium, and instructions stored on the at least one storage medium. The instructions may be configured to be readable from the at least one storage medium by at least one processor and thereby cause the at least one processor to operate so as to open a file containing a virtual disk of a virtual machine, parse the file to identify one or more partitions of the virtual disk, determine file system type for each of one or more partitions, identify a boot partition in the file, parse file system information of the boot partition to identify volume information, and generate volume composition information using the identified volume information.

In another particular exemplary embodiment, the techniques may be realized as a system for managing virtual machine backups comprising one or more processors communicatively coupled to a network. The one or more processors may be configured to open a file containing a virtual disk of a virtual machine, parse the file to identify one or more partitions of the virtual disk, determine file system type for each of one or more partitions, identify a boot partition in the file, parse file system information of the boot partition to identify volume information, and generate volume composition information using the identified volume information.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
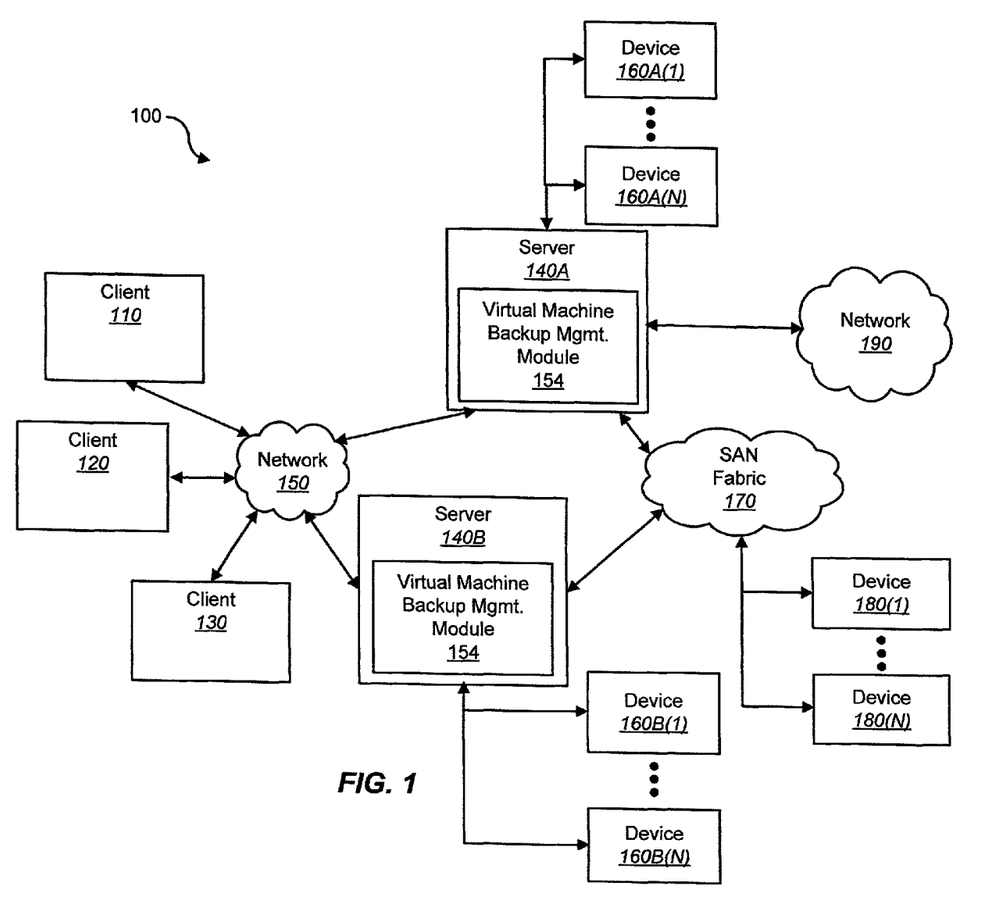
FIG. 1 shows a block diagram depicting a network architecture for managing virtual machine backups in accordance with an embodiment of the present disclosure.

FIG. 1 shows a block diagram depicting a network architecture 100 for managing virtual machine backups in accordance with an embodiment of the present disclosure. Figure is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., virtual machine backup management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
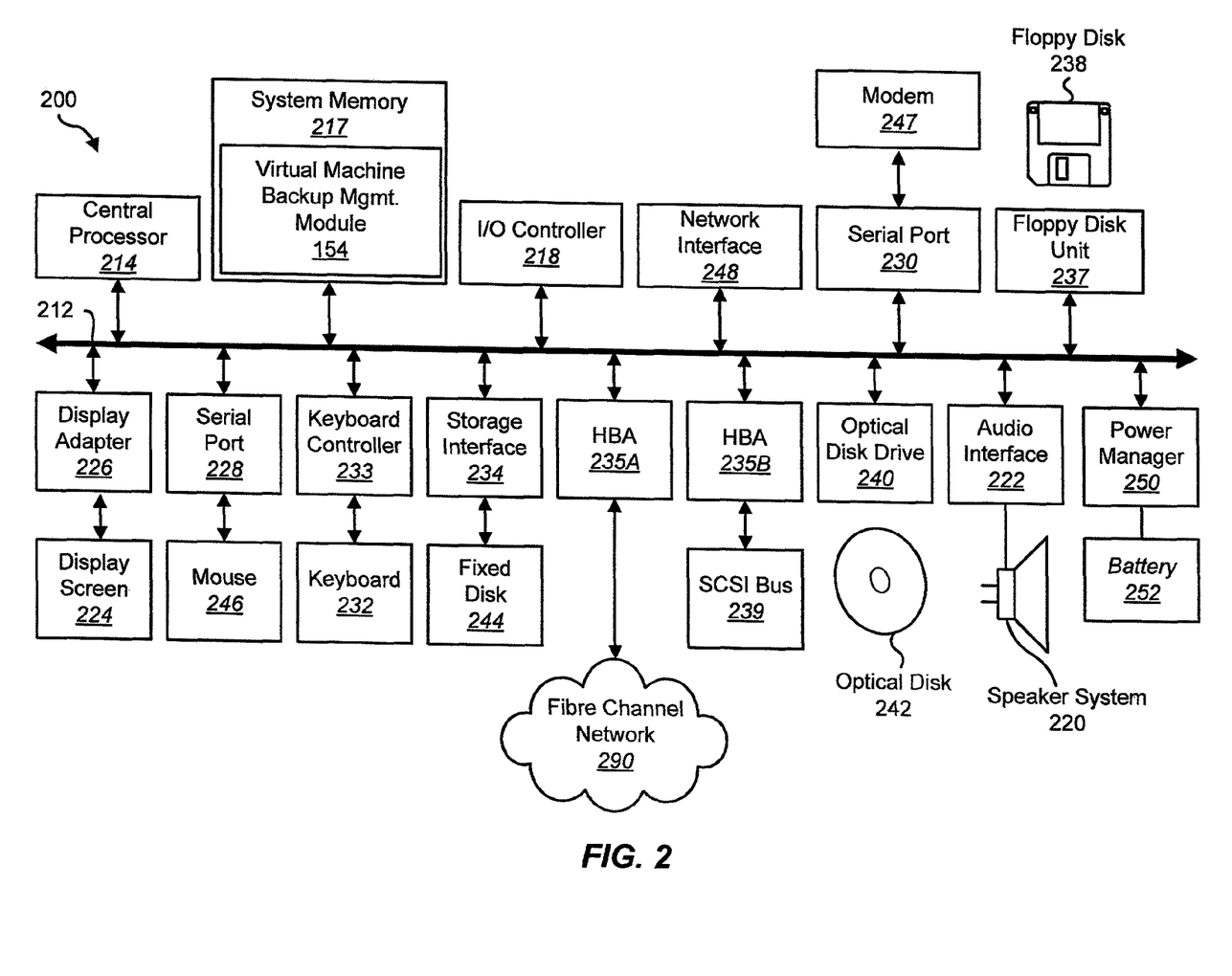
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

As illustrated, one or more portions of virtual machine backup management module may reside at a network centric location. For example, server 140A may be a server, a firewall, a gateway, or other network element that may perform one or more actions to determine volume composition of a machine for backup.

According to some embodiments, network 190 may be an external network (e.g., the Internet) and server 140A may be a gateway or firewall between one or more internal components and clients and the external network.

Figure 6:
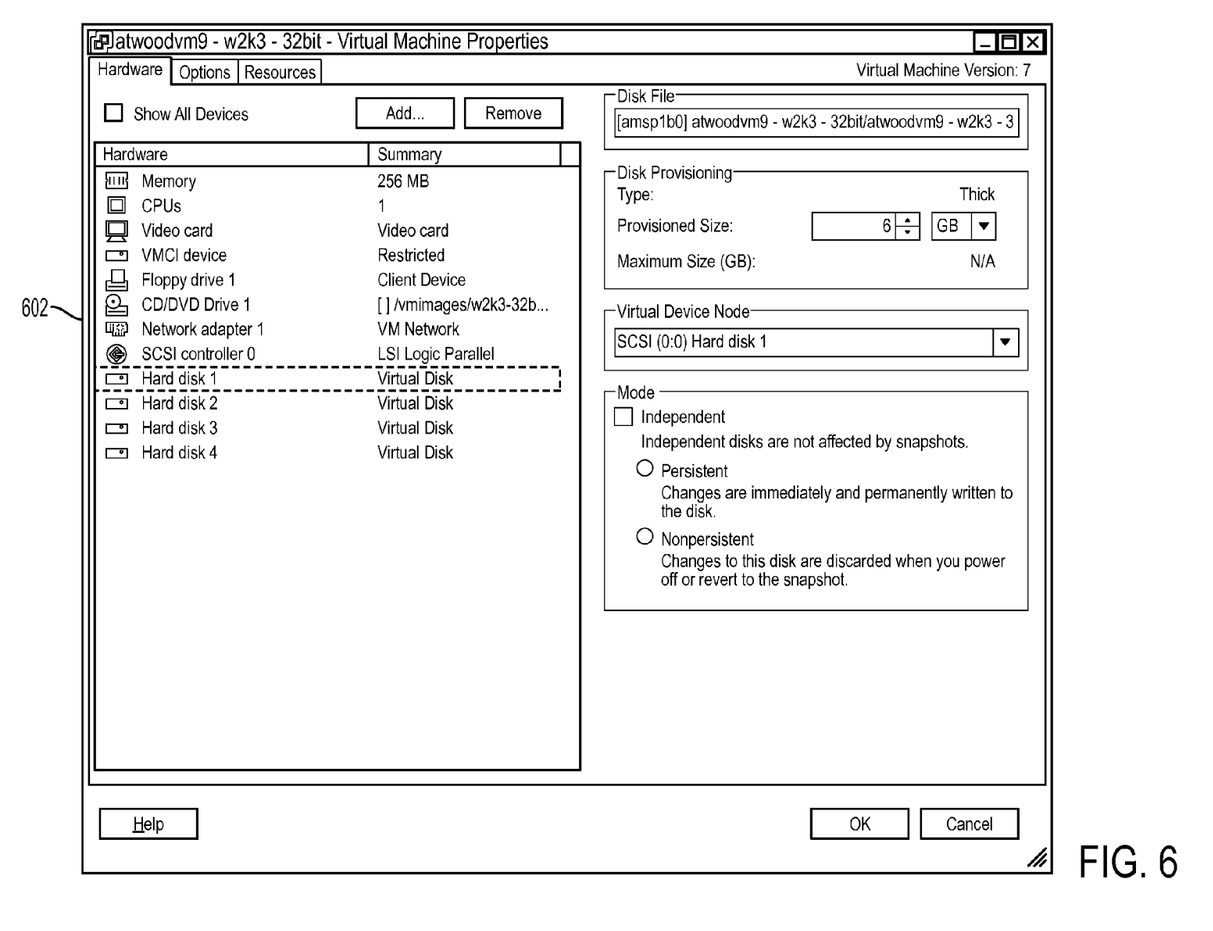
FIG. 6 depicts a screenshot illustrating virtual disks of a virtual machine in accordance with an embodiment of the present disclosure.
Figure 7:
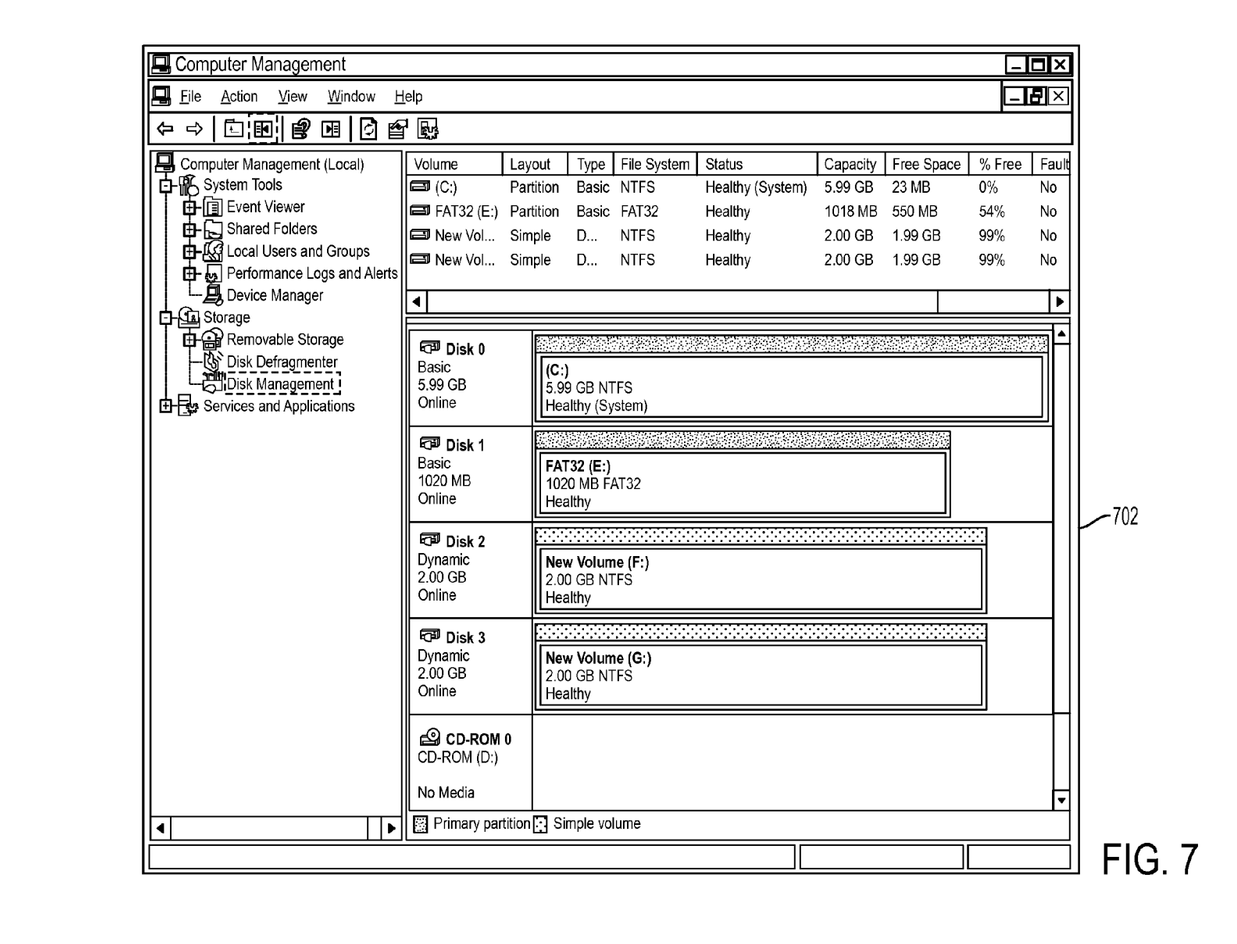
FIG. 7 depicts a screen shot illustrating the composition of virtual disks of a virtual machine in accordance with an embodiment of the present disclosure.

Referring to FIG. 6, there is depicted a screenshot illustrating virtual disks of a virtual machine in accordance with an embodiment of the present disclosure. Virtual machine properties window 602 illustrates that a particular virtual machine has four virtual disks. FIG. 7 depicts a screen shot illustrating the composition of virtual disks Disk 0, Disk 1, Disk 2, and Disk 3 of the exemplary virtual machine of FIG. 6 in accordance with an embodiment of the present disclosure. Disk management window 702 illustrates the volumes of the virtual disks (e.g., Volume C:, FAT 32 (E:), New Volume (F:), and New Volume (G:)), the file system types of the volumes and the association of Disk 0 to Volume C:, Disk 1 to FAT 32 (E:), Disk 2 to New Volume (F:), and Disk 3 to New Volume (G:).

Returning to FIG. 1, virtual machine backup management module 154 may process one or more files for backup to identify compositions of virtual disks. Virtual machine backup management module 154 detect the backup of virtual machine disk backup files or may be invoked in response to the backup of virtual machine disk files. Virtual machine backup management module 154 may determine a volume composition of a virtual disk by parsing a virtual machine disk backup file. According to some embodiments, the volume composition may be provided to a user to identify one or more volumes for backup or to confirm volumes being backed up. According to one or more embodiments, the volume composition may allow a restore process to mount one or more volumes to allow granular restoration. Volume composition information may be stored in a backup catalog, as part of a backup file, or in other locations. Volume composition information may be used to identify volumes which are not to be backed up. For example, swap space volumes may be excluded from a backup.

According to some embodiments, generation of volume composition information may be performed during backup. According to at least one embodiment, the generation of volume composition information may be performed subsequent to backup such as, for example, prior to restoration.

In order to determine volume composition of a virtual disk, virtual machine backup management module 154 may open files containing virtual machine disk backups such as, for example, virtual machine disk (VMDK) files. Virtual machine backup management module 154 may parse a Master Boot Record (MBR), an Extended Boot Record (EBR), and/or a Globally Unique Identifier (GUID) Partition Table (GPT) to identify one or more partition tables. Virtual machine backup management module 154 may parse a partition table of the opened file to determine one or more partitions on a virtual machine disk contained within the file. The opened file may also be parsed to determine whether a logical volume manager such as Microsoft's Logical Disk Manager, Veritas Volume Manager, a logical volume manager for Linux, Solaris Volume Manager, or another logical volume manager is used. If a logical volume manager is used, volume manager configuration information may be parsed by virtual machine backup management module 154 to identify one or more logical volumes. Configuration information for a logical volume manager may be contained in a database (e.g., a LDM database or LVM database).

Virtual machine backup management module 154 may then determine a file system for one or more partitions. Virtual machine backup management module 154 may be capable of parsing backup files containing a variety of file systems. For example, virtual machine backup management module 154 may be capable of parsing file systems such as File Allocation Table (FAT), NT File System (NTFS), a Linux extended file system (ext2, ext3, ext4), Unix File System (UFS), ZFS, Veritas File System (VxFS). Additionally, Virtual machine backup management module 154 may be extendible to incorporate logic for parsing new or additional file systems or releases of file systems. Once partitions on a logical disk have been identified in a file, volumes or logical volumes have been identified on one or more partitions, and the file system has been identified for one or more of the volumes, virtual machine backup management module 154 may identify expected system files in a volume based on the type of file system that was identified. Parsing the system files may allow virtual machine backup management module 154 to determine mount points, drive letters, and other volume composition information.

For a Microsoft Windows® compatible file system such as, for example, File Allocation Table (FAT) or NT File System (NTFS), virtual machine backup management module 154 may determine a location of a volume name and/or path to the volume. Virtual machine backup management module 154 may then determine a boot partition. Virtual machine backup management module 154 may parse Master File Table (MFT) records to identify system files. System files parsed for Microsoft Windows® compatible file systems may include a boot.ini file and/or Boot Configuration Data (BCD). Parsing of these system files may identify a system directory. Virtual machine backup management module 154 may examine a system directory to locate a registry. A located registry may then be parsed to find one or more mount points. Virtual machine backup management module 154 may use information obtained to assign drive letters and/or Globally Unique Identifiers (GUIDs) to a partition and/or a logical volume (e.g. Volume C: on disk 1, partition 2, offset N). This information may be stored as volume composition for the volume (e.g., stored in a backup catalog or as metadata associated with the backup).

Virtual machine backup management module 154 reads virtual disks directly and parses the file systems and system files by reading the backup file. Thus, there may be no dependency that backup server and virtual machine have the same file systems. The generation of the volume composition may not be dependent on the virtual disks being mounted to the backup server or the virtual machine being powered on, and does not require any code or agents running within the virtual machine.

According to some embodiments, while parsing a backup file to determine to composition of one or more volumes of a virtual disk, Virtual machine backup management module 154 may identify volumes that may be excluded from backup. For example, swap files may not require backup. While parsing a located registry of a Windows file system compatible volume, virtual machine backup management module 154 may identify the fully qualified paths to one or more swap files. The file system may then be parsed to find the extents of each swap file. Virtual machine backup management module 154 may then map the extents of the one or more swap files to sectors of a virtual disk, and exclude the mapped swap file sectors from a backup.

As discussed above, Virtual machine backup management module 154 may be capable of parsing volumes for a variety of file systems. For example, once a partition file system is identified, if the file system is determined to be Linux, the location of the volume name and/or path to the volume may be determined. Virtual machine backup management module 154 may parse the file system to identify the file systems table (fstab) and the mounted file systems table (mtab). Virtual machine backup management module 154 may then parse the identified mtab and fstab, and assign mount points to one or more of a partition and a logical volume. This volume composition information may be saved to a backup catalog, to the backup itself, or to another location.

According to some embodiments, some portions of virtual disks may not require backup. For example, Linux swap partitions may be excluded from backup. When virtual machine backup management module 154 is parsing a partition table it may identify one or more swap partitions for a Linux file system, and exclude the one or more identified swap partitions from a backup.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, virtual machine backup management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
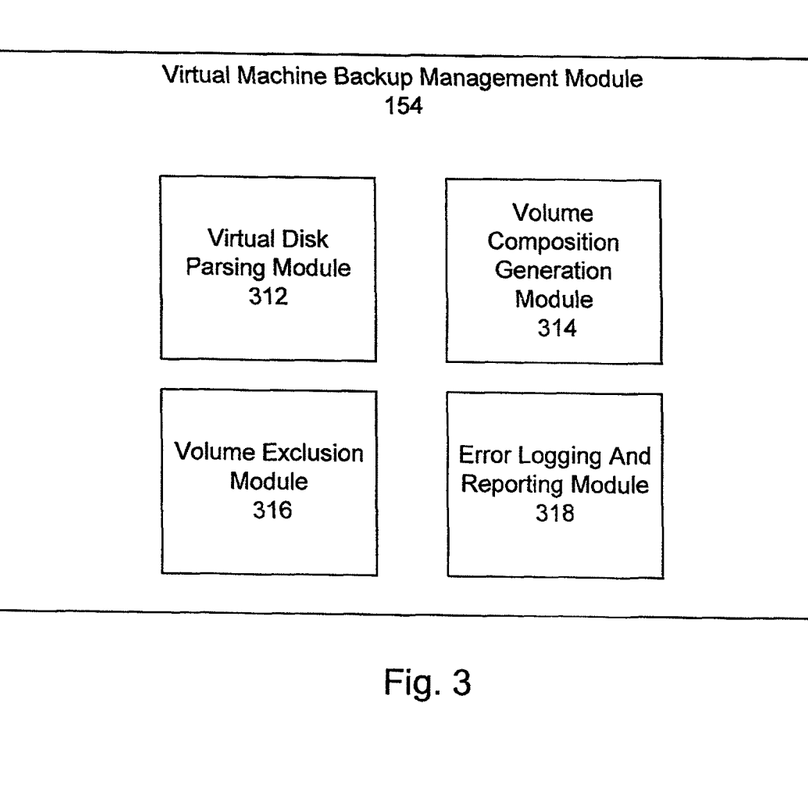
FIG. 3 shows a module for managing virtual machine backups in accordance with an embodiment of the present disclosure.

Referring to FIG. 3, there is shown a virtual machine backup management module 310 in accordance with an embodiment of the present disclosure. As illustrated, the virtual machine backup management module 310 may contain one or more components including virtual disk parsing module 312, volume composition generation module 314, volume exclusion module 316, and error logging and reporting module 318.

The description below describes network elements, computers, and/or components of a system and method for managing virtual machine backups that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Virtual disk parsing module 312 may determine volume composition of a virtual disk. Virtual disk parsing module 312 may open files containing virtual machine disk backups such as, for example, virtual machine disk (VMDK) files. Virtual disk parsing module 312 may parse a Master Boot Record (MBR), an Extended Boot Record (EBR), and/or a Globally Unique Identifier (GUID) Partition Table (GPT) to identify one or more partition tables. Virtual disk parsing module 312 may parse a partition table of the opened file to determine one or more partitions on a virtual machine disk contained within the file. The opened file may also be parsed to determine whether a logical volume manager is used. If a logical volume manager is used, volume manager configuration information may be parsed by Virtual disk parsing module 312 to identify one or more logical volumes. Virtual disk parsing module 312 may parse configuration information for a logical volume manager contained in a database (e.g., a LDM database or LVM database).

Virtual disk parsing module 312 may then determine a file system for one or more partitions. Once partitions on a logical disk have been identified in a file, volumes or logical volumes have been identified on one or more partitions, and the file system has been identified for one or more of the volumes, Virtual disk parsing module 312 may identify expected system files in a volume based on the type of file system that was identified. Parsing the system files may allow virtual machine backup management module 154 to determine mount points, drive letters, and other volume composition information.

For a Microsoft Windows® compatible file system such as, for example, File Allocation Table (FAT) or NT File System (NTFS), Virtual disk parsing module 312 may determine a location of a volume name and/or path to the volume. Virtual disk parsing module 312 may then determine a boot partition. System files parsed for Microsoft Windows® compatible file systems may include a boot.ini file and/or Boot Configuration Data (BCD). Parsing of these system files may identify a system directory. Virtual disk parsing module 312 may examine a system directory to locate a registry. A located registry may then be parsed to find one or more mount points. Virtual disk parsing module 312 may use information obtained to assign drive letters and/or Globally Unique Identifiers (GUIDs) to a partition and/or a logical volume (e.g. Volume C: on disk 0, partition 1, offset 0). Information identified by virtual disk parsing module 312 may be passed to volume composition generation module 314.

Virtual disk parsing module 312 may be capable of parsing volumes for a variety of file systems. For example, once a partition file system is identified, if the file system is determined to be Linux, the location of the volume name and/or path to the volume may be determined. Virtual disk parsing module 312 may parse the file system to identify the file systems table (fstab) and the mounted file systems table (mtab). Virtual disk parsing module 312 may then parse the identified mtab and fstab, and assign mount points to one or more of a partition and a logical volume. This volume composition information may be saved to a backup catalog, to the backup itself, or to another location.

Volume composition generation module 314 may receive information from virtual disk parsing module 312 such as for example, drive letters, Globally Unique Identifiers (GUIDs), which volumes are on which partitions of a virtual disk, which operating systems are on which volumes, etc. Volume composition generation module 314 may generate a volume composition for one or more volumes. Volume composition information may be stored in a backup catalog or as metadata associated with the backup.

Volume exclusion module 316 may identify one or more portions of a virtual disk (e.g., volumes) that do not require backup. According to some embodiments, Virtual disk parsing module 312, while parsing a backup file to determine to composition of one or more volumes of a virtual disk, may identify volumes swap files that may not require backup. Virtual disk parsing module 312 may pass swap information to volume exclusion module 316. While parsing a located registry of a Windows file system compatible volume, virtual disk parsing module 312 may identify the fully qualified paths to one or more swap files. Volume exclusion module 316 may parse the file system may to find the extents of each swap file. Volume exclusion module 316 may then map the extents of the one or more swap files to sectors of a virtual disk, and exclude the mapped swap file sectors from a backup.

Volume exclusion module 316 may also exclude Linux swap partitions, or partitions of other file systems from backup. Virtual disk parsing module 312 may parse a partition table and may identify one or more swap partitions for a Linux file system and pass the partition information to Volume exclusion module 316. Volume exclusion module 316 may exclude the one or more identified swap partitions from a backup.

Error logging and reporting module 318 may produce logs, reports, or other information associated with managing virtual machine backup composition determination and/or generation.

Figure 4:
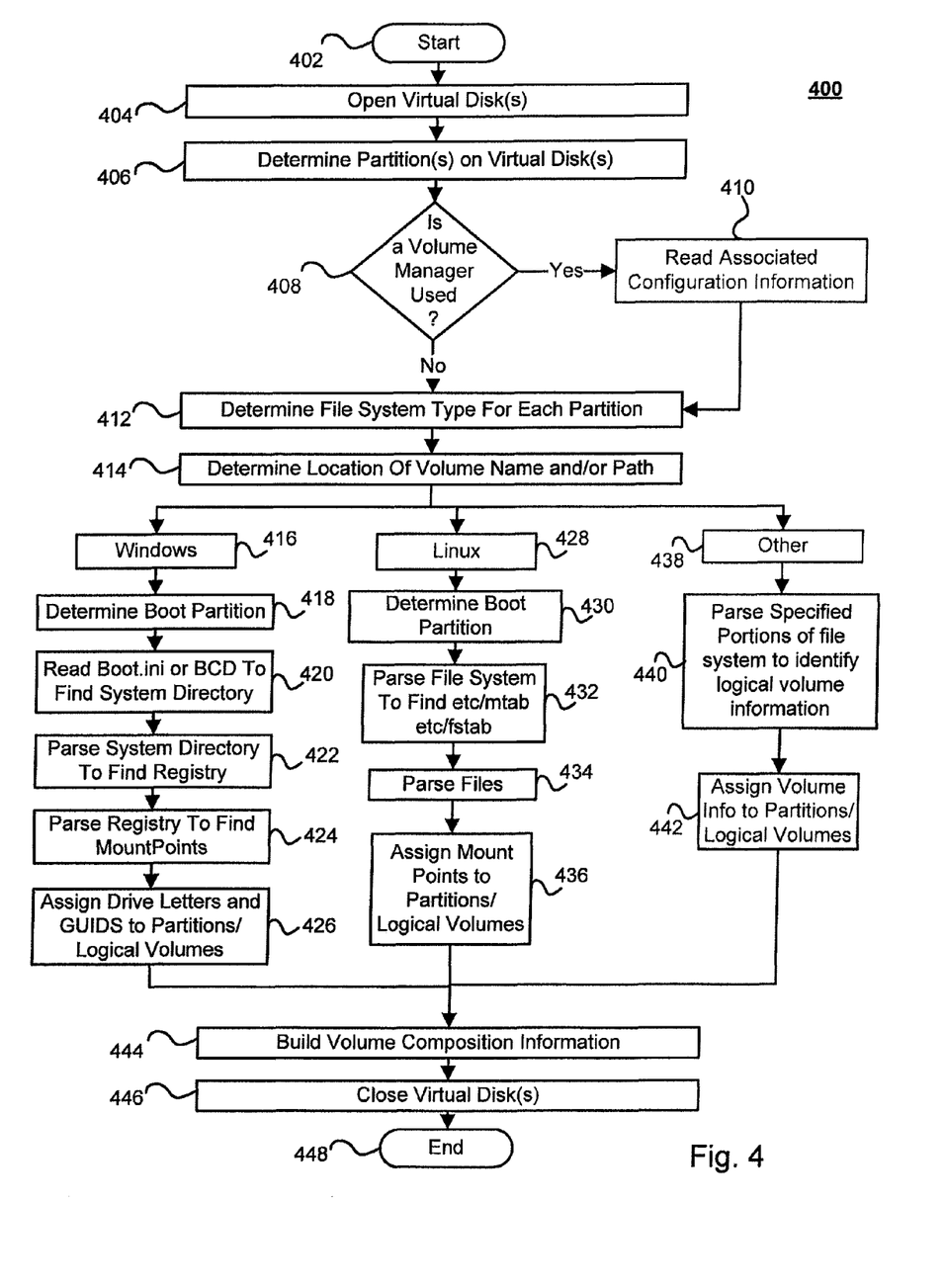
FIG. 4 depicts a method for managing virtual machine backups in accordance with an embodiment of the present disclosure.

Referring to FIG. 4, there is depicted a method 400 for managing virtual machine backups in accordance with an embodiment of the present disclosure. At block 402, the method 400 may begin.

At block 404, a virtual disk may be opened. Files containing virtual machine disk backups such as, for example, virtual machine disk (VMDK) files may be opened.

At block 406, a Master Boot Record (MBR), an Extended Boot Record (EBR), and/or a Globally Unique Identifier (GUID) Partition Table (GPT) may be parsed to identify one or more partition tables. A partition table of the opened file may be parsed to determine one or more partitions on a virtual machine disk contained within the file.

At block 406, the opened file may also be parsed to determine whether a logical volume manager is used. If a logical volume manager is used, the method 400 may continue at block 410. If a logical volume manager is not used, the method may continue at block 412.

At block 410, volume manager configuration information may be parsed to identify one or more logical volumes. Configuration information for a logical volume manager contained in a database (e.g., a LDM database or LVM database) may be parsed.

At block 412 a file system type may be determined for one or more partitions. Once partitions on a logical disk have been identified in a file, volumes or logical volumes have been identified on one or more partitions, and the file system has been identified for one or more of the volumes, expected system files in a volume may be identified based on the type of file system that was identified.

At block 414, parsing the system files may allow determination mount points, drive letters, volume name and fully qualified path, and other volume composition information.

For volumes with a Microsoft Windows® compatible file system the method may continue at block 416. For volumes with a Linux compatible file system the method may continue at block 428. For other file systems the method may continue at block 438.

At block 418, for a Microsoft Windows® compatible file system such as, for example, File Allocation Table (FAT) or NT File System (NTFS), a boot partition may be determined.

At block 420 system files parsed for Microsoft Windows® compatible file systems may include a boot.ini file and/or Boot Configuration Data (BCD). Parsing of these system files may identify a system directory.

At block 422 a system directory may be examined to locate a registry.

At block 424, a located registry may then be parsed to find one or more mount points.

At block 426, information obtained may be used to assign drive letters and/or Globally Unique Identifiers (GUIDs) to a partition and/or a logical volume (e.g. Volume C: on disk 0, partition 1, offset 0). Information identified may use information such as for example, drive letters, Globally Unique Identifiers (GUIDs), which volumes are on which partitions of a virtual disk, which operating systems are on which volumes, etc. to generate a volume composition for one or more volumes. Volume composition information may be stored in a backup catalog or as metadata associated with the backup at block 444.

At block 428, parsing of linux compatible file systems may begin.

At block 430, a boot partition may be identified.

At block 432, the file system may be parsed to identify the file systems table (fstab) and the mounted file systems table (mtab).

At block 434, the identified mtab and fstab files may be parsed to identify one or more mount points.

At block 436, one or more mount points may be assigned to one or more of a partition and a logical volume. This volume composition information may be saved to a backup catalog, to the backup itself, or to another location at block 444.

At block 438, other types of file systems may be parsed to identify volume composition information. For example, virtual disk volumes with file systems such as File Allocation Table (FAT), NT File System (NTFS), a Linux extended file system (ext2, ext3, ext4), Unix File System (UFS), ZFS, and Veritas File System (VxFS) may be parsed. Additionally, logic may be incorporated for parsing new or additional file systems or releases of file systems.

At block 440 specified portions of a file system may be parsed to identify logical volume information, based on a determined file system type.

At block 442 volume information may be assigned to partitions and/or logical volumes.

Volume composition information may be stored in a backup catalog or as metadata associated with the backup at block 444.

At block 446, one or more virtual disks may be closed.

At block 448, the method 400 may end.

Figure 5:
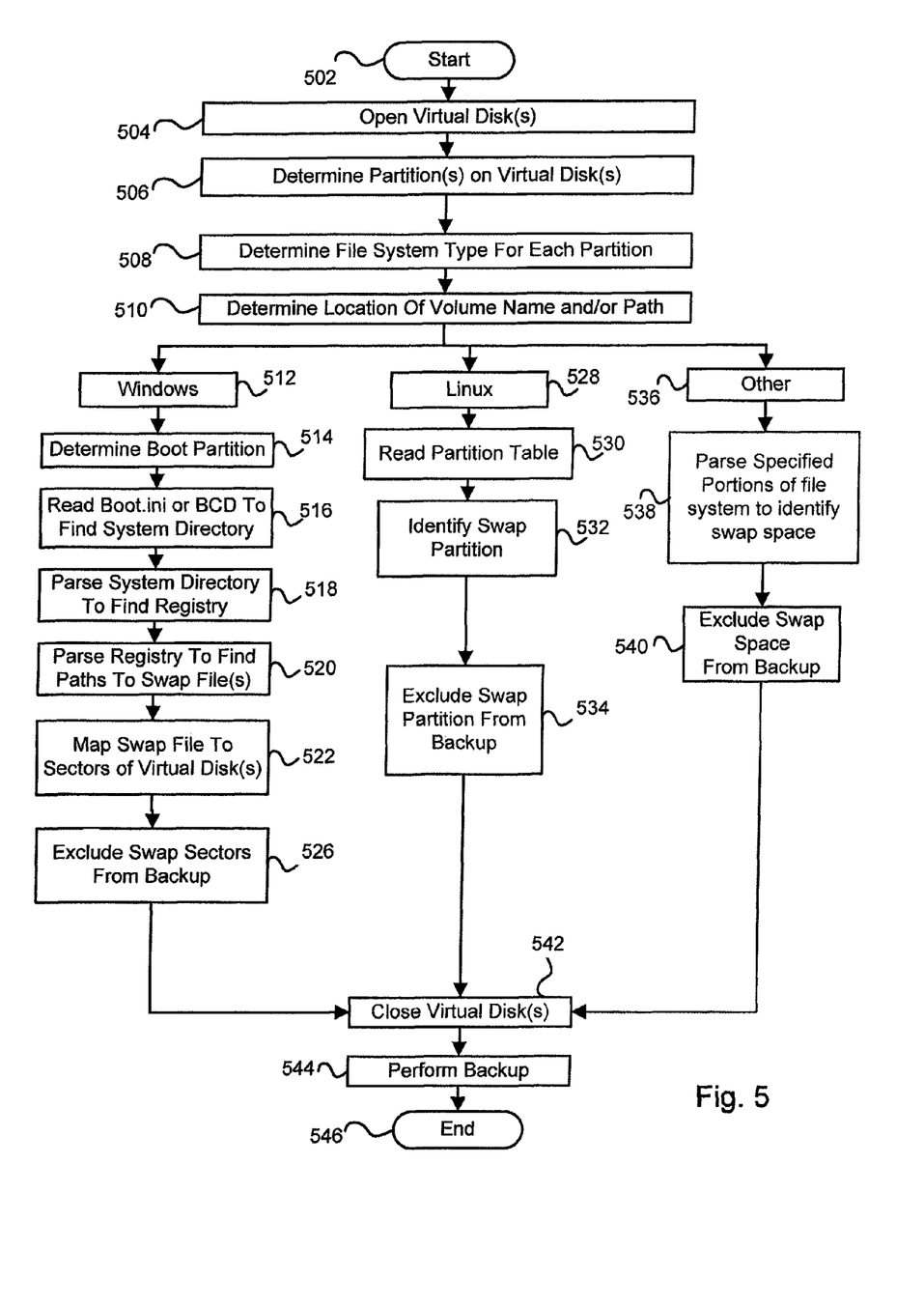
FIG. 5 depicts a method for identifying space to exclude storage from backup in accordance with an embodiment of the present disclosure.

FIG. 5 depicts a method for identifying space to exclude storage from backup in accordance with an embodiment of the present disclosure. At block 502, the method 500 may begin.

At block 504, a virtual disk may be opened. Files containing virtual machine disk backups such as, for example, virtual machine disk (VMDK) files may be opened.

At block 506, a Master Boot Record (MBR), an Extended Boot Record (EBR), and/or a Globally Unique Identifier (GUID) Partition Table (GPT) may be parsed to identify one or more partition tables. A partition table of the opened file may be parsed to determine one or more partitions on a virtual machine disk contained within the file.

At block 508 a file system type may be determined for one or more partitions. Once partitions on a logical disk have been identified in a file, volumes or logical volumes have been identified on one or more partitions, and the file system has been identified for one or more of the volumes, expected system files in a volume may be identified based on the type of file system that was identified.

At block 510, parsing the system files may allow determination mount points, drive letters, volume name and fully qualified path, and other volume composition information.

For volumes with a Microsoft Windows® compatible file system the method may continue at block 512. For volumes with a Linux compatible file system the method may continue at block 528. For other file systems the method may continue at block 536.

At block 514, for a Microsoft Windows® compatible file system such as, for example, File Allocation Table (FAT) or NT File System (NTFS), a boot partition may be determined.

At block 516 system files parsed for Microsoft Windows® compatible file systems may include a boot.ini file and/or Boot Configuration Data (BCD). Parsing of these system files may identify a system directory.

At block 518 a system directory may be examined to locate a registry.

At block 520, a located registry may then be parsed to find paths one or more swap files.

At block 522, swap files may be mapped to sectors of a virtual disk.

At block 526, swap sectors may be excluded from backup.

At block 528, parsing of linux compatible file systems may begin.

At block 530, partition table may be read.

At block 532, swap files may be identified by the information gained from reading the partition table.

At block 534, swap partitions may be excluded from backup.

At block 536, other types of file systems may be parsed to identify volume composition information. For example, virtual disk volumes with file systems such as File Allocation Table (FAT), NT File System (NTFS), a Linux extended file system (ext2, ext3, ext4), Unix File System (UFS), ZFS, and Veritas File System (VxFS) may be parsed. Additionally, logic may be incorporated for parsing new or additional file systems or releases of file systems.

At block 538 specified portions of a file system may be parsed to identify swap space.

At block 540 the identified swap space may be excluded from backup.

At block 542, one or more virtual disk files may be closed.

At block 544, a backup may be performed.

At block 546, the method 500 may end.

It should be noted that although FIGS. 4 and 5 are described separately, according to some embodiments, much of the work may be performed concurrently. Specifically, parsing of files to identify information may be used for both processes. For example, if a registry is identified, it may be used both to identify mount points and swap space, without having to perform the parsing necessary to locate the registry a second time. Similarly if a Linux partition table is being read for a volume, the process may determine both the boot partition as well as any swap partitions without having to perform processing necessary to locate the volume and determine the file system type a second time.

At this point it should be noted that managing virtual machine backups in accordance with the present disclosure as described above typically involves the processing of input data and the generation of output data to some extent. This input data processing and output data generation may be implemented in hardware or software. For example, specific electronic components may be employed in a virtual machine backup management module or similar or related circuitry for implementing the functions associated with managing virtual machine backups in accordance with the present disclosure as described above. Alternatively, one or more processors operating in accordance with instructions may implement the functions associated with managing virtual machine backups in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing virtual machine backups comprising:
   opening, using a virtual machine backup management component configured to parse backup files of a plurality of different file systems, a backup file containing a backup of a virtual disk of a virtual machine;
   parsing the backup file to identify a plurality of partitions of the virtual disk;
   determining a file system type for each of the plurality of partitions, wherein one or more volumes are identified for each of the plurality of partitions, wherein a plurality of different file system types are determined, and expected system files are identified in the one or more volumes based upon the file system type;
   parsing the expected system files to determine volume composition information;
   identifying a boot partition in the backup file for each of the plurality of partitions;
   parsing file system information of each boot partition to identify the one or more volumes associated with each of the plurality of partitions;
   parsing file system information of each boot partition to identify swap space associated with each of the plurality of partitions;
   excluding the identified swap space from a subsequent backup;
   assigning volume information to each of the plurality of partitions and the identified one or more volumes, wherein the volume information comprises one or more of drive letters and Globally Unique Identifiers (GUIDs) and mount points parsed from one or more file system tables;
   storing the volume composition information associated with the identified volume; and
   performing the subsequent backup excluding the identified swap space.

2. The method of claim 1, wherein the volume composition information comprises one or more of mount points, drive letters, volume name, and qualified path.

3. The method of claim 1, wherein the volume composition information is provided to a user to identify one or more volumes for backup.

4. The method of claim 1, wherein the volume composition information allows a restore process to mount one or more volumes to allow granular restoration.

5. The method of claim 1, wherein parsing the backup file to identify the plurality of partitions of the virtual disk comprises examining one or more of: a master boot record and an extended boot record.

6. The method of claim 1, wherein parsing the backup file to identify the plurality of partitions of the virtual disk comprises examining a Globally Unique Identifier (GUID) Partition Table (GPT).

7. The method of claim 1, wherein parsing the backup file to identify the plurality of partitions of the virtual disk comprises determining that a logical volume manager is used and reading configuration information for the logical volume manager.

8. The method of claim 7, wherein the configuration information for the logical volume manager is parsed to identify one or more logical volumes.

9. The method of claim 1, wherein the file system type for each of the plurality of partitions comprises at least one of: File Allocation Table (FAT), NT File System (NTFS), Linux extended file system (EXT), Unix File System (UFS), Zettabyte File System (ZF S), and Veritas File System (VxFS).

10. The method of claim 1, wherein at least one of the plurality of partitions comprises a Windows compatible partition, and parsing file system information of the boot partition for the Windows compatible partition to identify the one or more volumes associated with the Windows compatible partition comprises:
  reading one or more of a boot.ini file or Boot Configuration Data (BCD) to identify a system directory;
  parsing the identified system directory to locate a registry; and
  parsing the located registry to find one or more mount points.

11. The method of claim 1, wherein at least one of the plurality of partitions comprises a Linux compatible partition, and parsing file system information of the boot partition for the Linux compatible partition to identify the one or more volumes associated with the Linux compatible partition comprises:
  parsing the file system to identify the file systems table (fstab) and the mounted file systems table (mtab); and
  parsing the identified mtab and fstab.

12. The method of claim 1, wherein the volume composition information is generated during a backup.

13. The method of claim 1, wherein the volume composition information is generated prior to a restoration.

14. The method of claim 1, wherein at least one of the plurality of partitions comprises a Windows compatible partition, and parsing file system information of the boot partition for the Windows compatible partition to identify the one or more volumes associated with the Windows compatible partition comprises:
  reading one or more of a boot.ini file or Boot Configuration Data (BCD) to identify a system directory;
  parsing the identified system directory to locate a registry;
  parsing the located registry to find paths to one or more swap files;
  mapping the one or more swap files to sectors of a virtual disk; and
  excluding the mapped swap file sectors from a backup.

15. The method of claim 1, wherein at least one of the plurality of partitions comprises a Linux compatible partition, and parsing tile system information of the boot partition for the Linux compatible partition to identify the one or more volumes associated with the Linux compatible partition comprises:
  parsing a partition table to identify one or more swap partitions; and
  excluding the one or more identified swap partitions from a backup.

16. The method of claim 2, wherein storing the volume composition information comprises writing the volume composition information to a backup catalog.

17. The method of claim 4, wherein granular restoration comprises restoration of one or more of: an individual file, a collection of files, an Exchange mailbox, a database table, and a user specified data object.

18. At least one non-transitory processor readable storage medium for storing a computer program of instructions configured to be readable by at least one processor for instructing the at least one processor to execute a computer process for performing the method as recited in claim 1.

19. An article of manufacture for managing virtual machine backups, the article of manufacture comprising:
  at least one non-transitory processor readable storage medium; and
  instructions stored on the at least one storage medium;
  wherein the instructions are configured to be readable from the at least one storage medium by at least one processor and thereby cause the at least one processor to operate so as to:
    open, using a virtual machine backup management component configured to parse backup files of a plurality of different file systems, a backup file containing a backup of a virtual disk of a virtual machine;
    parse the file to identify a plurality of partitions of the virtual disk;
    determine a file system type for each of the plurality of partitions, wherein one or more volumes are identified for each of the plurality of partitions, wherein a plurality of different file system types are determined, and expected system files are identified in the one or more volumes based upon the file system type;
    parse the expected system files to determine volume composition information;
    identify a boot partition in the backup file for each of the plurality of partitions;
    parse file system information of each boot partition to identify the one or more volumes associated with each of the plurality of partitions;
    parse file system information of each boot partition to identify swap space associated with each of the plurality of partitions;
    exclude the identified swap space from a subsequent backup;
    assign volume information to each of the plurality of partitions and the identified one or more volumes, wherein the volume information comprises one or more of drive letters and Globally Unique Identifiers (GUIDs) and mount points parsed from one or more file system tables;
    store the volume composition information associated with the identified volume information; and
  performing the subsequent backup excluding the identified swap space.

20. A system for managing virtual machine backups comprising:
  one or more processors communicatively coupled to a network; wherein the one or more processors are configured to:
    open, using a virtual machine backup management component configured to parse backup files of a plurality of different file systems, a file containing a backup of a virtual disk of a virtual machine;
    parse the file to identify a plurality of partitions of the virtual disk;
    determine a file system type for each of the plurality of partitions, wherein one or more volumes are identified for each of the plurality of partitions, wherein a plurality of different file system types are determined, and expected system files are identified in the one or more volumes based upon the file system type;
    parse the expected system files to determine volume composition information;

identify a boot partition in the backup file for each of the plurality of partitions;

parse file system information of each boot partition to identify the one or more volumes associated with each of the plurality of partitions;

parse file system information of each boot partition to identify swap space associated with each of the plurality of partitions;

exclude the identified swap space from a subsequent backup;

assign volume information to each of the plurality of partitions and the identified one or more volumes, wherein the volume information comprises one or more of drive letters and Globally Unique Identifiers (GUIDs) and mount points parsed from one or more file system tables;

storing the volume composition information associated with the identified volume; and performing the subsequent backup excluding the identified swap space.

* * * * *